(12) United States Patent
Nishimoto et al.

(10) Patent No.: US 6,687,566 B2
(45) Date of Patent: Feb. 3, 2004

(54) METHOD OF MACHINING A FEMALE SCREW AND DRESSING A GRINDING WHEEL FOR FEMALE SCREW MACHINING

(75) Inventors: Takashi Nishimoto, Kani (JP); Fumitoshi Terasaki, Kani (JP)

(73) Assignee: Okuma Corporation, Niwa-Gun (JP)

( * ) Notice: Subject to any disclaimer, the term of this patent is extended or adjusted under 35 U.S.C. 154(b) by 39 days.

(21) Appl. No.: 10/132,035

(22) Filed: Apr. 25, 2002

(65) Prior Publication Data

US 2002/0183887 A1 Dec. 5, 2002

(30) Foreign Application Priority Data

Apr. 27, 2001 (JP) ........................................ 2001-131833

(51) Int. Cl.[7] .............................................. G06F 19/00
(52) U.S. Cl. ............................ 700/164; 451/48; 409/66
(58) Field of Search ............................. 700/164; 451/5, 451/11, 9, 48, 56; 409/66, 74, 76, 77

(56) References Cited

U.S. PATENT DOCUMENTS

| | | | |
|---|---|---|---|
| 4,566,226 A | * 1/1986 | Kimura | .......................... 451/5 |
| 4,813,188 A | * 3/1989 | Becker et al. | .................. 451/5 |
| 5,088,244 A | 2/1992 | Shirakura et al. | ............. 451/48 |
| 5,104,268 A | * 4/1992 | Kitagawa et al. | ............. 409/66 |
| 5,170,590 A | * 12/1992 | Sato et al. | ..................... 451/48 |
| 5,289,660 A | * 3/1994 | Terasaki et al. | ............... 451/49 |
| 5,746,643 A | * 5/1998 | Terasaki et al. | ................ 451/5 |
| 6,460,435 B1 | * 10/2002 | Meyer et al. | ................. 82/1.11 |

FOREIGN PATENT DOCUMENTS

JP          8-11329         2/1996

* cited by examiner

Primary Examiner—Leo Picard
Assistant Examiner—Zoila Cabrera
(74) Attorney, Agent, or Firm—Foley Hoag LLP

(57) ABSTRACT

The present invention provides a method of machining a female screw groove in a workpiece whereby the spindle of an internal grinding wheel for machining the workpiece into a female screw is tilted relative to the screw's axis at an angle ($\xi$) smaller than the lead angle ($\alpha$) of the female screw. First, specifications of the female screw, data on the configuration of the thread groove, and the tilt angle are supplied to a program for calculating data on dressing of the grinding wheel wherein the locus of the groove on cross-sections normal to the axis of the grinding wheel and wheel dressing data are calculated. Second, the grinding wheel on the aforementioned spindle is shaped or dressed by simultaneous triaxial control of the rotation of the single point dresser about a b-axis, and the feed of the grinding wheel table along a z-axis and a cross slide along an x-axis based on the foregoing data. Thereupon, the female screw is machined with the dressed grinding wheel.

17 Claims, 10 Drawing Sheets

Fig. 5

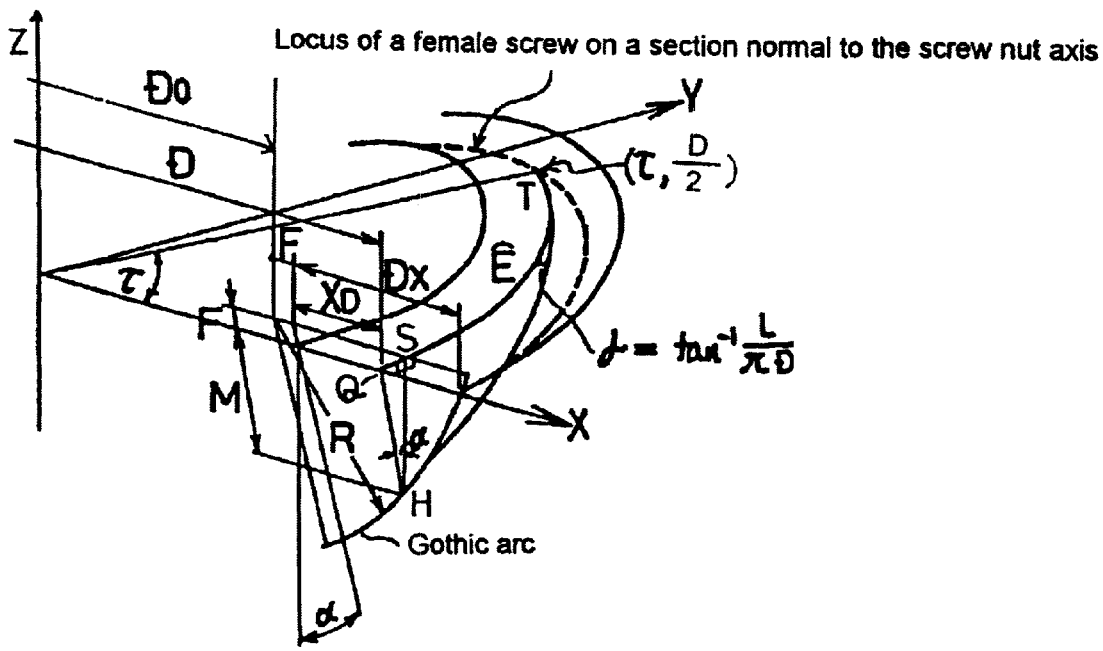

$$\overset{\frown}{QS} + \overset{\frown}{ST} = \overset{\frown}{E} = \tau \times \frac{D}{2}$$

$$\frac{\tau}{2\pi} = \frac{\overset{\frown}{E}}{\pi D} \qquad \therefore \tau = \frac{2E}{D}$$

Substitute $M \sin\alpha + M \cdot \dfrac{\pi D}{L} \cos\alpha$ for E $$\tau = \frac{2}{D}\left(M \sin\alpha + M \cdot \frac{\pi D}{L} \cos\alpha\right)$$

$$= 2M \left(\frac{\sin\alpha}{D} + \frac{\pi}{L} \cos\alpha\right)$$

$$= 2M \cdot N$$

In the above, $N = \dfrac{\sin\alpha}{D} + \dfrac{\pi}{L} \cos\alpha$ $M = \overline{QH}$

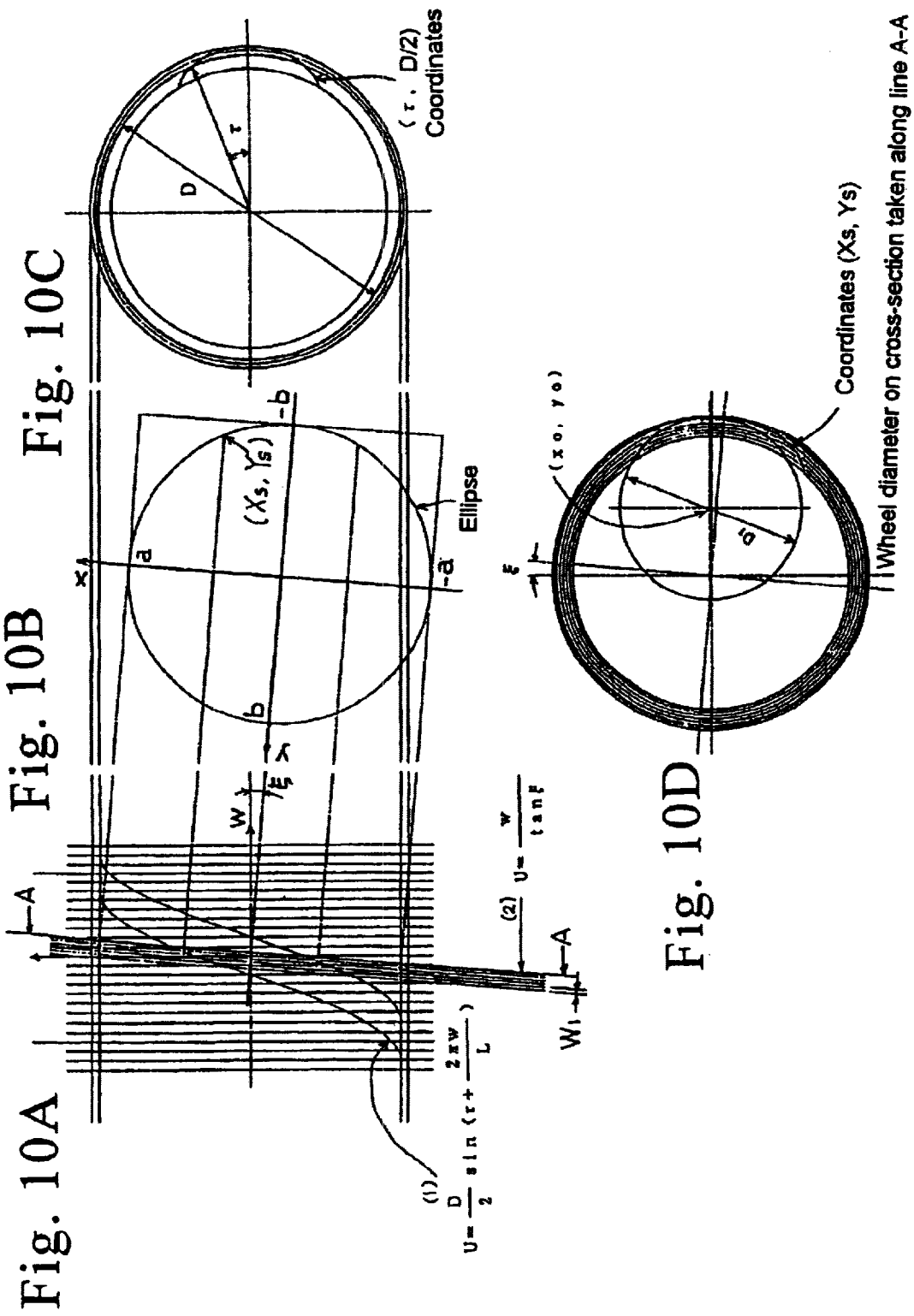

(1) $U = \frac{D}{2} \sin(\tau + \frac{2\pi w}{L})$  (2) $U = \frac{w}{\tan \xi}$

METHOD OF MACHINING A FEMALE SCREW AND DRESSING A GRINDING WHEEL FOR FEMALE SCREW MACHINING

This application claims priority on Japanese Patent Application No. 2001-131833 filed on Apr. 27, 2001 the contents of which are incorporated herein by reference.

BACKGROUND OF THE INVENTION

1. Field of the Invention

The present invention relates to a method of machining a screw-shaped portion or screw groove in a workpiece, particularly, when a female screw groove is ground by means of a machine tool, such as a grinder.

2. Description of the Related Art

Various methods for machining a female (or internal) screw thread-groove by grinding are, as schematically shown in FIGS. 12A–C, already known. In the method shown in FIG. 12A, an internal grinding wheel spindle 101 is tilted relative to a workpiece 102 at the same angle as the lead angle α of the screw groove while the workpiece is machined with a grinding wheel 103 mounted on one end of a grinding wheel quill 104. According to this method, the grinding wheel 103 is shaped by a form rotary dresser that has an identical contour to that of the female thread-groove to be machined.

In the method shown in FIG. 12B, the internal grinding wheel spindle 101 is tilted relative to the workpiece 102 at an angle, ξ, which is smaller than the lead angle α of the screw thread while the workpiece is machined with a grinding wheel 103. In this case, the grinding wheel 103 is machined with a form rotary dresser whose shape corresponds to the shape of the female groove to be machined. More particularly, after the shape of the female thread-groove is determined, numerous form rotary dressers are machined until one with an optimal shape is obtained through corrections and adjustments.

The method illustrated in FIG. 12C is disclosed in Japanese Published Examined Patent Application No. 8-11329, in which the internal grinding wheel spindle 101 is disposed in parallel to the axis of the workpiece 102 during the machining of the desired female groove. According to this method, the shape of the grinding wheel 103 is first calculated from data representing specifications of the female thread-groove. The grinding wheel 103 is then machined by a single point dresser under synchronous numerical control on the basis of data representing the calculated grinding wheel shape. When the lead angle α is large or when deep grinding is required, this method has the advantage over the one shown in FIG. 12A of being capable of avoiding interference between the grinding wheel quill 104 and the female screw groove.

While achieving their intended objectives, the foregoing conventional methods suffer from a number of deficiencies that reduce their utility. For example, the method of FIG. 12A, which is very commonly practiced, has an inherent problem in that a female screw groove cannot be machined if the lead angle α of the screw thread is very large or if deep grooving is required, as the wheel quill 104 interferes with the thread-groove, thus limiting the machinable ranges.

The method of FIG. 12B is often employed if the lead angle α of the female screw thread is relatively large with respect to the hole diameter bored in the workpiece. In contrast to the method of FIG. 12A, this particular method reduces the interference between the grinding wheel quill 104 and the hole in the workpiece, thereby enabling machining of female screws with larger lead angles α and greater depths. However, machining female screws by this method proves a time-consuming process as much trial and error is required to determine a suitable shape for the grinding wheel.

If the third known method (FIG. 12C) is employed to grind a female screw with a large lead angle α, considerable interference occurs between the female screw groove and the grinding wheel 103, requiring reduction in the diameter of the grinding wheel and thus the diameter of the wheel quill 104.

SUMMARY OF THE INVENTION

In view of the above-identified problems, an important object of the present invention is to provide a method of correctly shaping an internal grinding wheel without trial and error and machining a female screw in a workpiece, while the axis of the wheel spindle tilted relative to the axis of the workpiece at an angle smaller than the lead angle of the screw thread.

Another important object of the present invention is to provide a method of grinding a female screw with an internal grinding wheel spindle machined without trial and error as above.

Another important object of the present invention is to provide a method of dressing, without trial and error, an internal grinding wheel suitable for machining a female screw groove in a workpiece while the axis of the wheel spindle tilted relative to the axis of the workpiece at an angle smaller than the lead angle of the screw thread to be machined.

The above objects and other related objects are realized by the invention, which provides a method of machining a female screw groove in a hole in a female screw workpiece extending along a z-axis with an internal grinding wheel coupled to a spindle having an axis, with the axis of the spindle being tilted relative to the z-axis at an angle smaller than the lead angle of the female screw thread, whereby relative rotation is caused between the workpiece and the grinding wheel while relative movement is caused between the grinding wheel and the workpiece along the z-axis and along an x-axis normal to the z-axis. The method comprises the steps of: (A) providing data representing specifications of the female screw and the tilt angle of the axis of the wheel spindle relative to the z-axis; (B) obtaining data on dressing the grinding wheel from the data representing the specifications of the female screw and the tilt angle of the wheel spindle axis; (C) dressing the grinding wheel on the basis of the obtained dressing data by simultaneous triaxial control of relative movement between the grinding wheel and a single point dresser along the z-axis of the workpiece and the x-axis, and rotation of a tip of the single point dresser about a b-axis in the plane defined by the x- and z-axes; and (D) machining the female screw groove with the dressed grinding wheel.

According to the conventional method whereby the spindle axis is maintained parallel to the axis of the workpiece, the diameter of the grinding wheel must be decreased as the lead angle of the female screw thread increases, which in turn reduces the diameter of the wheel spindle, thus sacrificing the rigidity of the spindle. According to the method of the invention, however, the spindle of the internal grinding wheel is disposed at a smaller angle relative to the axis of the spindle than the lead angle of the female screw thread throughout the machining operation, such that a relatively large-diameter grinding wheel with an accordingly large-diameter spindle can be employed so as to prevent reduction in the spindle rigidity resulting from a small spindle diameter.

According to one aspect of the present invention, the grinding wheel has a width along the axis of the wheel spindle and the workpiece is machined to a female ball screw with a Gothic arc profile, and the specifications of the female screw includes data representing: the lead of the female screw; the radius of the Gothic arc; a Gothic arc offset value; the diameter of the female ball screw as measured between the centers of diametrically opposing balls; and the diameter of the cross-section of the grinding wheel located at the center of the wheel's width and oriented normal to the wheel spindle axis.

According to another aspect of the present invention, the grinding wheel has a diameter that changes along the axis of the wheel spindle, and additionally, the step of obtaining data for dressing the grinding wheel includes the steps of:

a) calculating the distance from the center of a ball to a bottom of the screw groove and the coordinates of the center of the grinding wheel on a cross-section normal to the wheel spindle axis;

b) determining the polar coordinates of the locus of the female screw groove on a cross-section normal to the axis of the workpiece from the distance calculated in step (a);

c) calculating from the polar coordinates determined in step (b) the sinusoidal locus of the female screw groove projected onto a cross-section in which the axis of the workpiece is located;

d) calculating the coordinates of the intersection of the sinusoidal locus and the wheel cross-section normal to the spindle axis;

e) calculating the diameter of the grinding wheel on the wheel cross-section normal to the spindle axis from the coordinates calculated in step (d) and the coordinates calculated in step (a); and f) repeating steps (a)–(e) so as to calculate the diameter of the grinding wheel on a plurality of cross-sections normal to the axis of the wheel spindle, thus determining an outer shape of the grinding wheel.

According to still another aspect of the present invention, the internal grinding wheel, the spindle thereof, and the single point dresser constitute part of a numerically controlled grinder including a processing unit, and additionally, the step of providing data includes the step of entering the data representing the specifications of the female screw and the tilt angle into the processing unit of the numerically controlled grinder, whereas the step of obtaining data for dressing the grinding wheel includes the step of executing in the processing unit a computer program for generating data on an outer shape of the grinding wheel from the data representing the specifications of the female screw and the tilt angle of the spindle axis.

According to yet another aspect of the present invention, the step of executing a computer program includes the step of compensating the data on the outer shape for the tilt angle of the axis of the grinding wheel spindle.

The foregoing method permits (1) automatic generation of data on the geometry of a grinding wheel tilted, during machining, with respect to the spindle axis at an angle smaller than the screw's lead angle based on certain specifications of the female screw and the tilt angle of the spindle axis and (2) generation of data for dressing a grinding wheel by additional processing of the data on the geometry of the grinding wheel.

The invention further provides a method of dressing with a single point dresser an internal grinding wheel for machining a female screw, the grinding wheel including a spindle which has an axis tilted during dressing relative to a z-axis of a workpiece at an angle smaller than the lead angle of the female screw to be machined in the workpiece, the method comprising the steps of:

I. providing data representing specifications of the female screw and the tilt angle of the spindle axis relative to the z-axis of the workpiece;

II. calculating data representing an outer shape of the grinding wheel from the data representing specifications of the female screw and the tilt angle of the wheel spindle axis;

III. generating, from the data calculated in step II, data representing (i) relative movement between the single point dresser and the grinding wheel along the z-axis and an x-axis normal to the z-axis and (ii) simultaneous rotation of a tip of the single point dresser in the plane defined by the x- and y-axes about a b-axis normal to the x-y plane; and IV. dressing the grinding wheel on the basis of the data generated in step (III).

According to one feature of the present invention, the grinding wheel has a width along the axis of the wheel spindle and the workpiece is machined to a female ball screw with a Gothic arc profile, and further wherein the specifications of the female screw includes data on: the lead of the female screw; the radius of the Gothic arc; a Gothic arc offset value; the diameter of the female ball screw as measured between the centers of diametrically opposing balls; and the diameter of the cross-section of the grinding wheel located at the center of the wheel's width and oriented normal to the wheel spindle axis.

In one embodiment, the grinding wheel has a diameter that changes along the axis of the wheel spindle, and further wherein the step of calculating data representing an outer shape of the grinding wheel includes the steps of:

a) calculating the distance from the center of a ball to a bottom of the screw and the coordinates of the center of the grinding wheel on a cross-section normal to the wheel spindle axis;

b) determining the polar coordinates of the locus of the female screw groove on a cross-section normal to the axis of the workpiece from the distance calculated in step (a);

c) calculating from the polar coordinates determined in step (b) the sinusoidal locus of the female screw groove projected onto a cross-section in which the axis of the workpiece is located;

d) calculating the coordinates of the intersection of the sinusoidal locus and the wheel cross-section normal to the spindle axis;

e) calculating the diameter of the grinding wheel on the wheel cross-section normal to the spindle axis from the coordinates calculated in step (d) and the coordinates calculated in step (a); and f) repeating steps (a)–(e) so as to calculate the diameter of the grinding wheel on a plurality of cross-sections normal to the axis of the wheel spindle, thus determining an outer shape of the grinding wheel.

In another embodiment, the internal grinding wheel, the spindle thereof, and the single point dresser constitute part of a numerically controlled grinder including a processing unit, and additionally, step (I) includes the step of entering the data representing the specifications of the female screw and the tilt angle into the processing unit of the numerically controlled grinder, and step (II) includes the step of executing in the processing unit a computer program for generating data on an outer shape of the grinding wheel from the data representing the specifications and the tilt angle.

The inventor proposed in Japanese Published Examined Patent Application No. 8-11329 (briefly described above) a method of machining a workpiece with an internal grinding wheel with the axis of the wheel disposed in parallel to the axis of the workpiece whereby the outer shape of the grinding wheel is computed by mathematical expressions. According to the present invention, this technology is further developed (1) to compute data on the outer shape of a grinding wheel for machining a female screw groove in a workpiece, with the axis of the grinding wheel spindle tilted at an angle smaller than the lead angle of the screw thread relative to the workpiece axis throughout machining and (2) to perform automatic dressing of the grinding wheel by executing simultaneous triaxial control of a machine tool on the basis of the data thus generated.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which:

FIG. 5 is a view used to explain the polar coordinates of the locus of a thread on a section normal to the axis of the screw;

Figure 7:
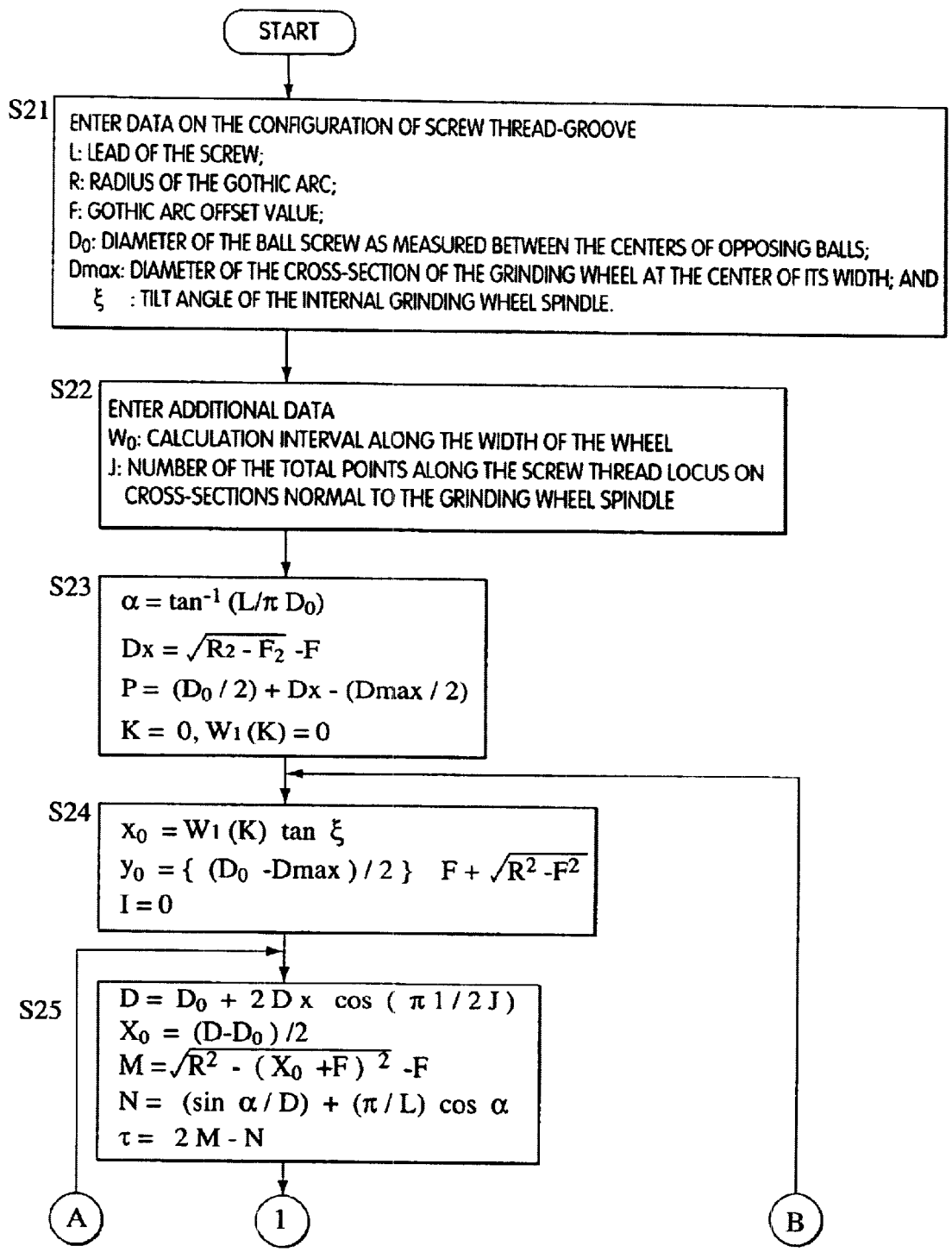
Figure 8:
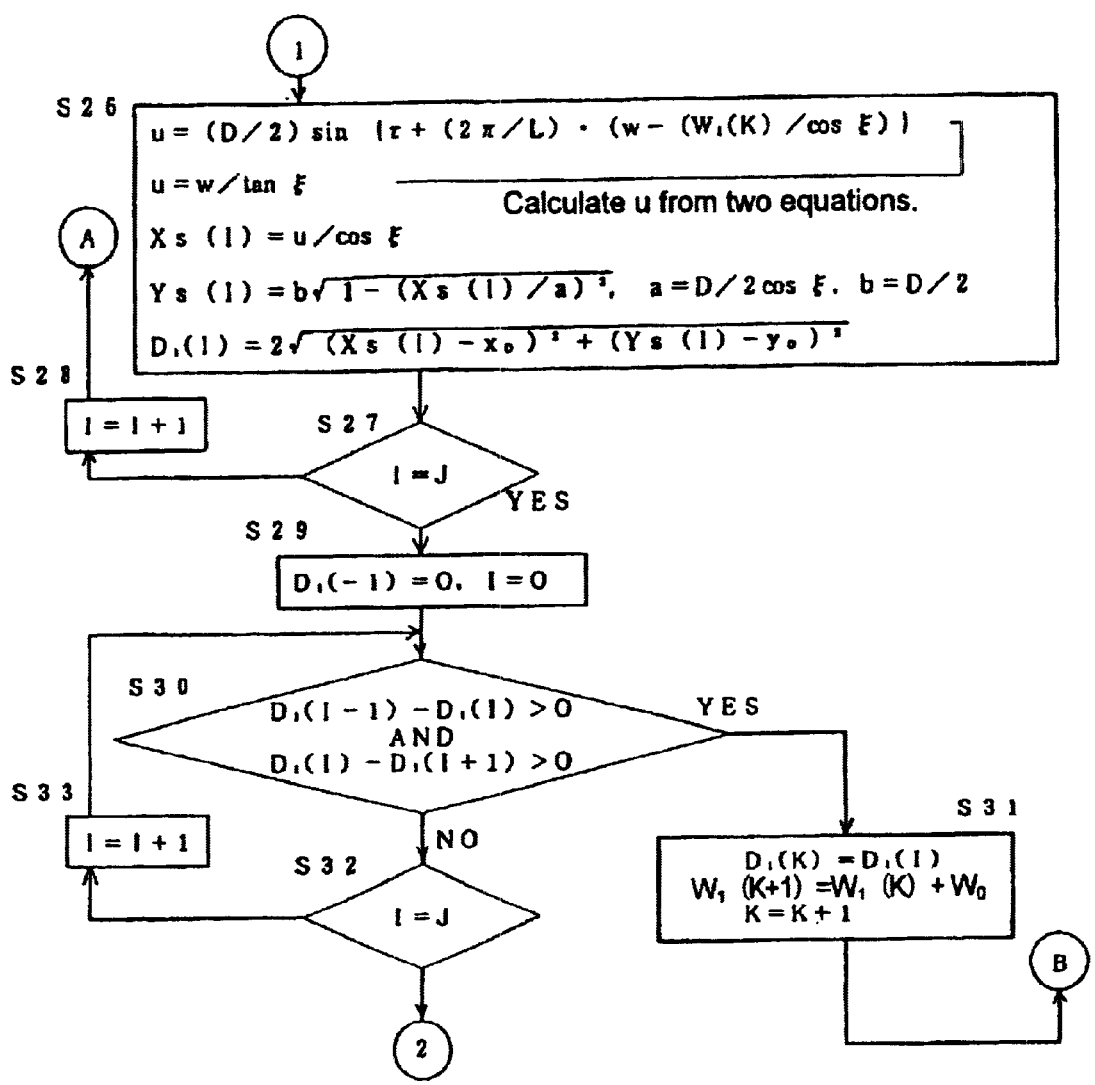
Figure 9:
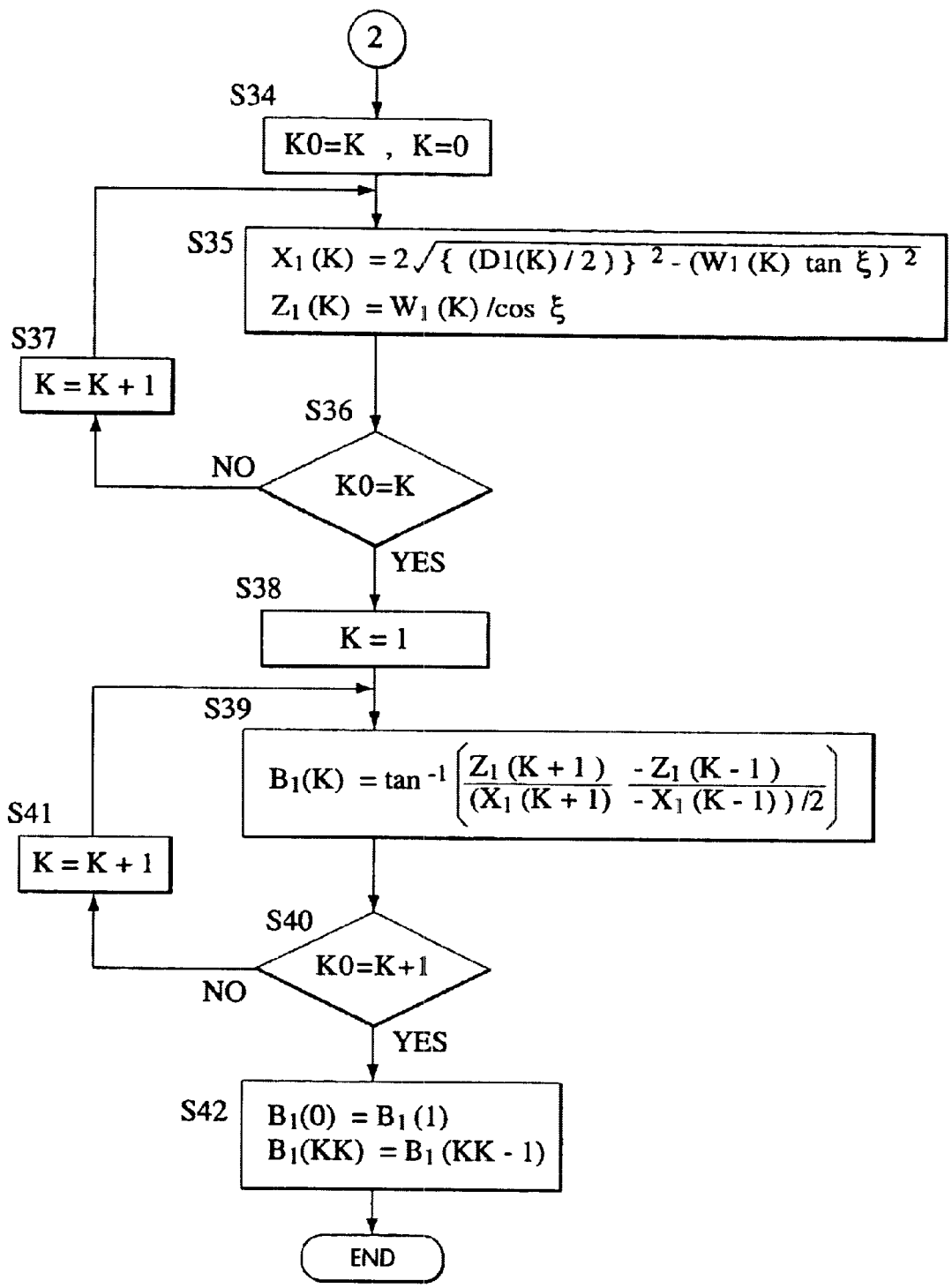

FIGS. 7–9, when taken together, form a flowchart describing a program for calculating data on the dressing of a grinding wheel;

FIGS. 10A–D are geometrical representation of a workpiece and a grinding wheel for explaining symbols used in the expressions for calculating the data for dressing the grinding wheel when the wheel is held at a tilt angle $\xi$ with respect to the axis of the workpiece during machining of the workpiece, in which; FIG. 10A shows the coordinates (u, w) of the intersection of the sinusoidal locus of the screw thread-groove and a plane normal to the axis of the internal grinding wheel spindle; FIG. 10B shows the coordinates (Xs, Ys) of the locus of the screw groove on a section normal to the axis of the internal grinding wheel spindle; FIG. 10C shows the polar coordinates ($\tau$, D/2) of the locus of the groove; and FIG. 10D is a cross-sectional view of the female screw of FIG. 10A, showing the center of the grinding wheel ($x_o$, $y_o$) and the diameter $D_1$ of the grinding wheel.

Figure 11A:
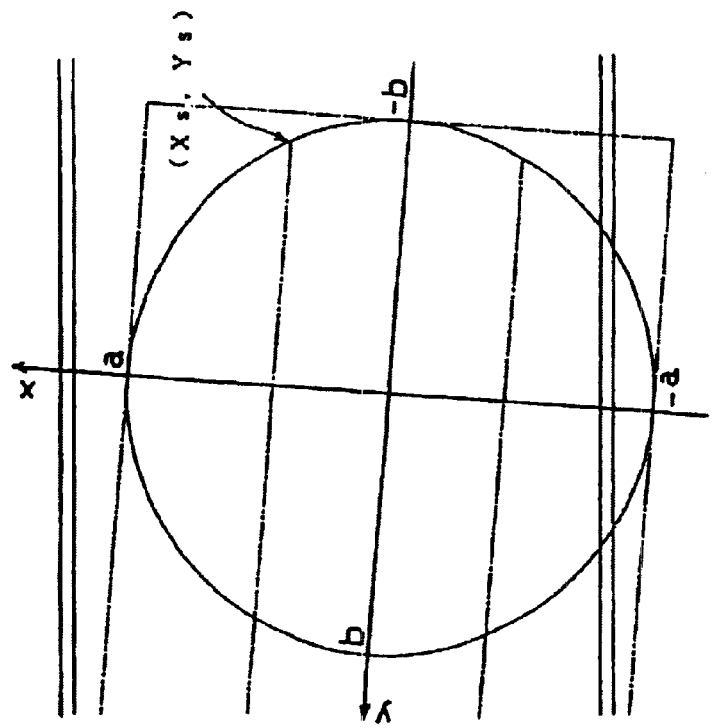
Figure 11B:
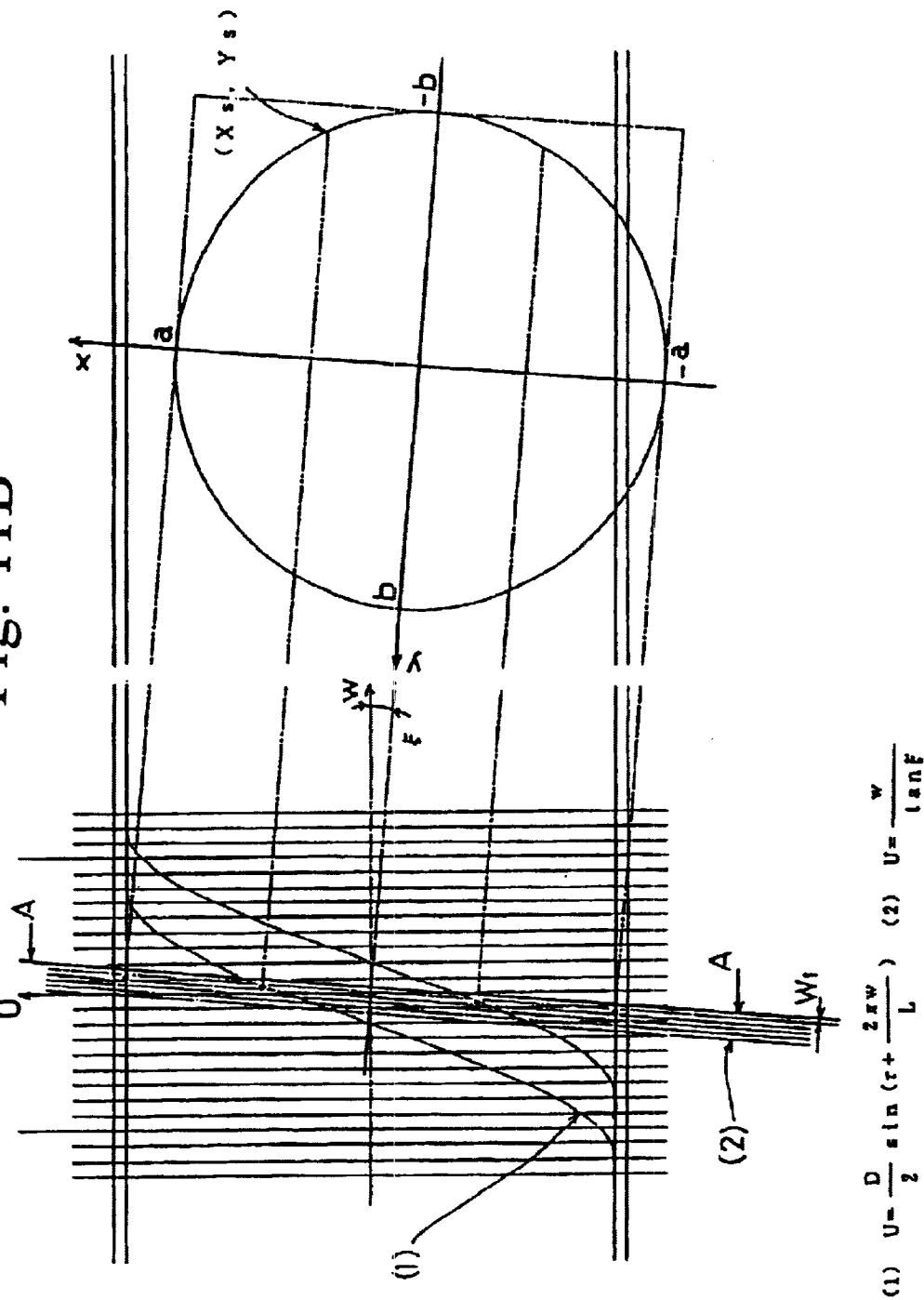
Figure 12A:
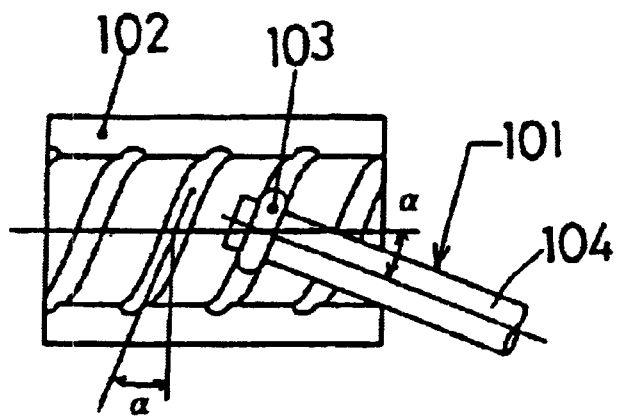
Figure 12B:
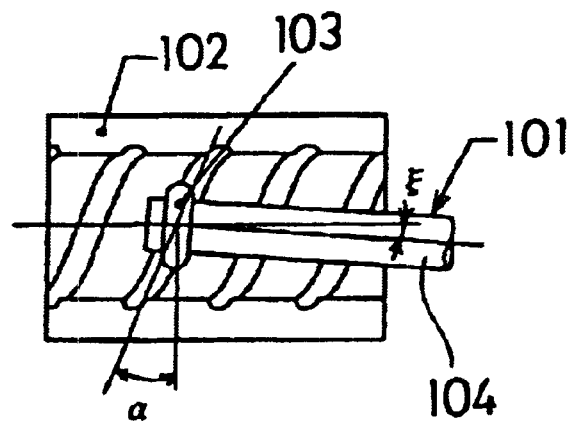
Figure 12C:
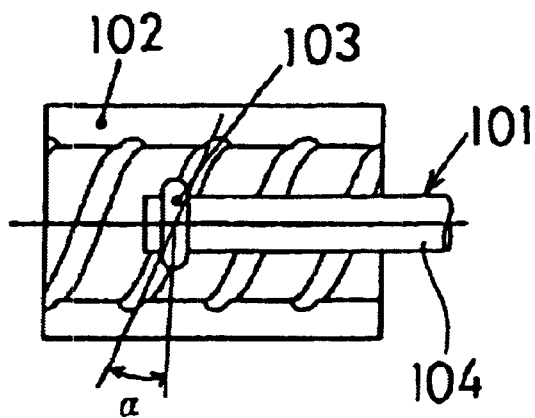

FIGS. 11A and B are enlarged views of FIGS. 10A and B, respectively;

FIG. 12A is a schematic view showing a known method of machining a female screw thread-groove with an internal grinding wheel spindle tilted relative to a workpiece at the same angle as the lead angle of the screw thread. According to this method, the grinding wheel is shaped or contoured with a form rotary dresser;

FIG. 12B is a schematic view showing another known method of machining a female screw groove with an internal grinding wheel spindle tilted relative to a workpiece at an angle smaller than the lead angle of the screw thread. According to this method, a dresser with an optimal shape is previously obtained by trial and error; and FIG. 12C is a schematic view showing another known method of machining a female screw groove whereby an internal grinding wheel spindle is aligned with the axis of a workpiece; the contour of the wheel suitable for the screw groove to be machined is calculated by mathematical expressions; the wheel is dressed or machined with a single point dresser on the basis of the calculated data representing the contour of the wheel; and the desired screw groove is machined with the dressed grinding wheel.

DETAILED DESCRIPTION OF THE PREFERRED EMBODIMENT

A preferred embodiment according to the present invention will be described hereinafter with reference to the attached drawings.

Figure 1:
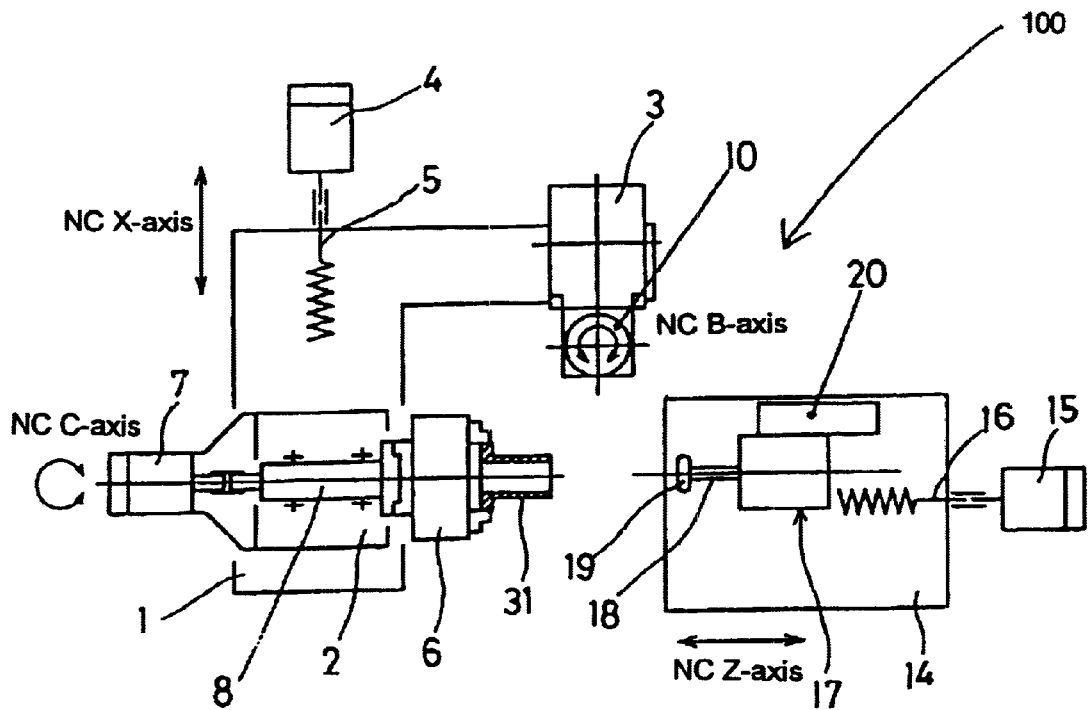
FIG. 1 is a schematic view of a drive system of a numerically controlled (NC) grinder according to the present invention.
Figure 2:
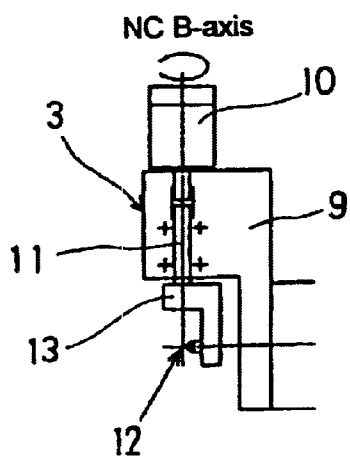
FIG. 2 is a schematic view of a single point dresser section of the NC grinder shown in FIG. 1.

FIGS. 1 and 2 schematically show a drive system of a numerically controlled (NC) grinder 100 according to the present invention and a single point dresser section of the grinder 100 shown in FIG. 1, respectively. In FIG. 1, a cross slide 1 is disposed on the left side of a bed 30 (see FIG. 3) of the NC grinder 100 in such a manner as to be movable in the direction of the x-axis (i.e., the direction of the depth of cut). Fixed onto the cross slide 1 are a head stock 2 and a wheel dressing device 3. The movement of the cross slide 1 is controlled through an x-axis feed screw 5 which extends in the direction normal or perpendicular to the axis of the head stock 2 and can be driven by a servomotor 4. The head stock 2 has a spindle 8 rotatably supported thereby via bearings. A chuck 6 is fitted on the front end of the spindle 8, with the rear end of the spindle 8 connected to a servomotor 7 so as to be driven thereby about the c-axis. The wheel dressing device 3 has a mounting stock 9 and a dresser spindle 11 rotatably supported by the stock 9 via bearings. The top end of the rotary dresser spindle 11 is coupled to a servomotor 10 so as to be driven thereby about the b-axis.

Provided on the bottom end of the dresser spindle 11 is an inverted L-shaped diamond holder 13 on which a single point dresser 12 is mounted with its tip pointing in a direction normal to the central axis of the dresser spindle 11. The diamond holder 13 is provided in such a manner that its position is adjustable in the direction in which the single point dresser 12 is directed.

Figure 3:
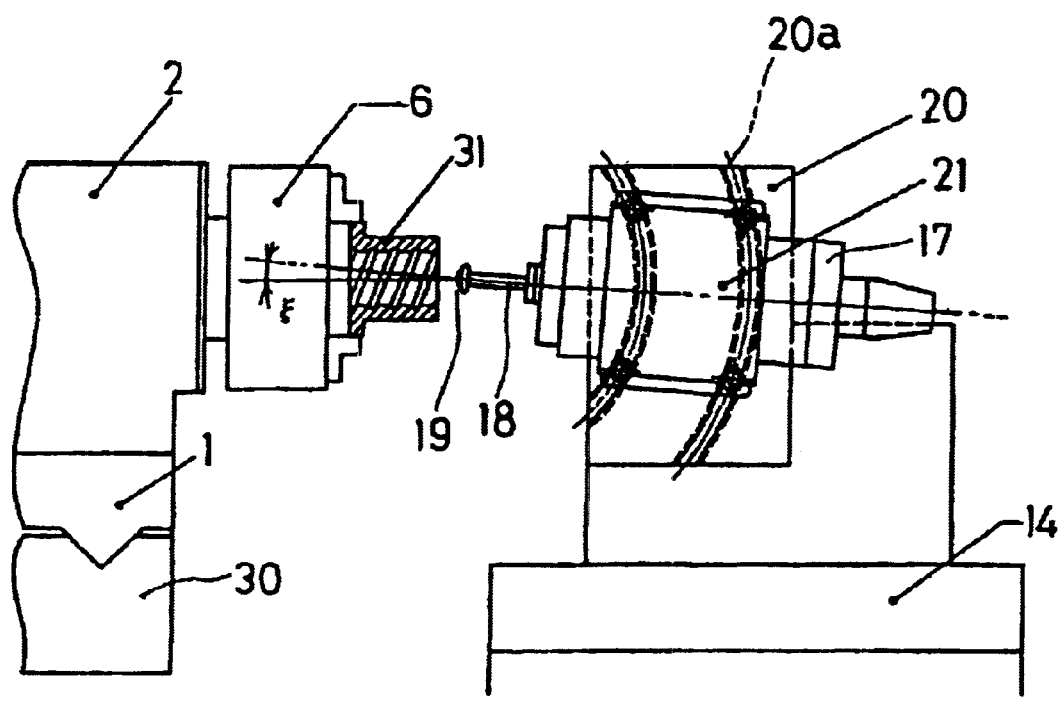
FIG. 3 is a side elevational view showing a grinding wheel spindle on a mounting stock that can tilt the wheel spindle relative to a workpiece axis within a predetermined range of angles.

Referring to FIG. 3, a table 14 is provided on the right-hand side of the table 30 in opposition to the head stock 2. The table 14 is adapted to be movable along the axis of the spindle 8 (i.e., the z-axis), and the movement or feed of the table 14 is controlled through a z-axis feed screw 16 which is driven by a servomotor 15. Moreover, provided on the table 14 is an internal grinding wheel spindle assembly 17 which is driven by a dedicated motor capable of operating at high rotational speeds. The grinding wheel spindle assembly 17 is disposed in such a manner that the tilt angle of its axis relative to the z-axis is adjustable as described in further detail below. The rotary shaft of the high-speed motor is formed integrally with the one end of a wheel quill or spindle 18, whereas a grinding wheel 19 is mounted on the other top end of the quill 18.

Figure 4:
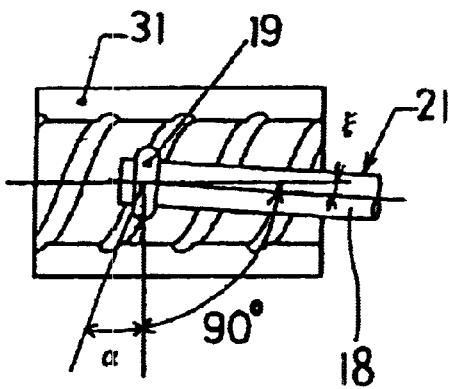
FIG. 4 shows the position of a grinding wheel spindle with respect to a workpiece according to a method of the present invention for grinding a female screw groove.

Referring to FIGS. 3 and 4, provided on the table 14 (movable along the z-axis) to the right of the bed 30 is a mounting stock 20 for mounting the grinding wheel spindle assembly 17 on the stock's side surface by means of a grinding wheel spindle holder 21. In addition, two concentric arcuate grooves 20a are provided in the mounting stock 20 with the grooves' common center located at the grinding wheel 19 so as to guide the wheel spindle assembly 17 therealong. By such circular guiding of the wheel spindle assembly 17, the axis of the grinding quill 18 can be aligned with the axis of the workpiece 31 and also form with the axis of the workpiece 31 an angle, $\xi$, that is smaller than the lead angle $\alpha$ of the female screw thread to be machined. The angle $\xi$, shown in FIG. 4, is selected from the range of $0<\xi<\alpha$.

A computer program for generating data for dressing the grinding wheel 19 according to the invention and its execution will be described with reference to FIGS. 5 to 11.

Figure 6:
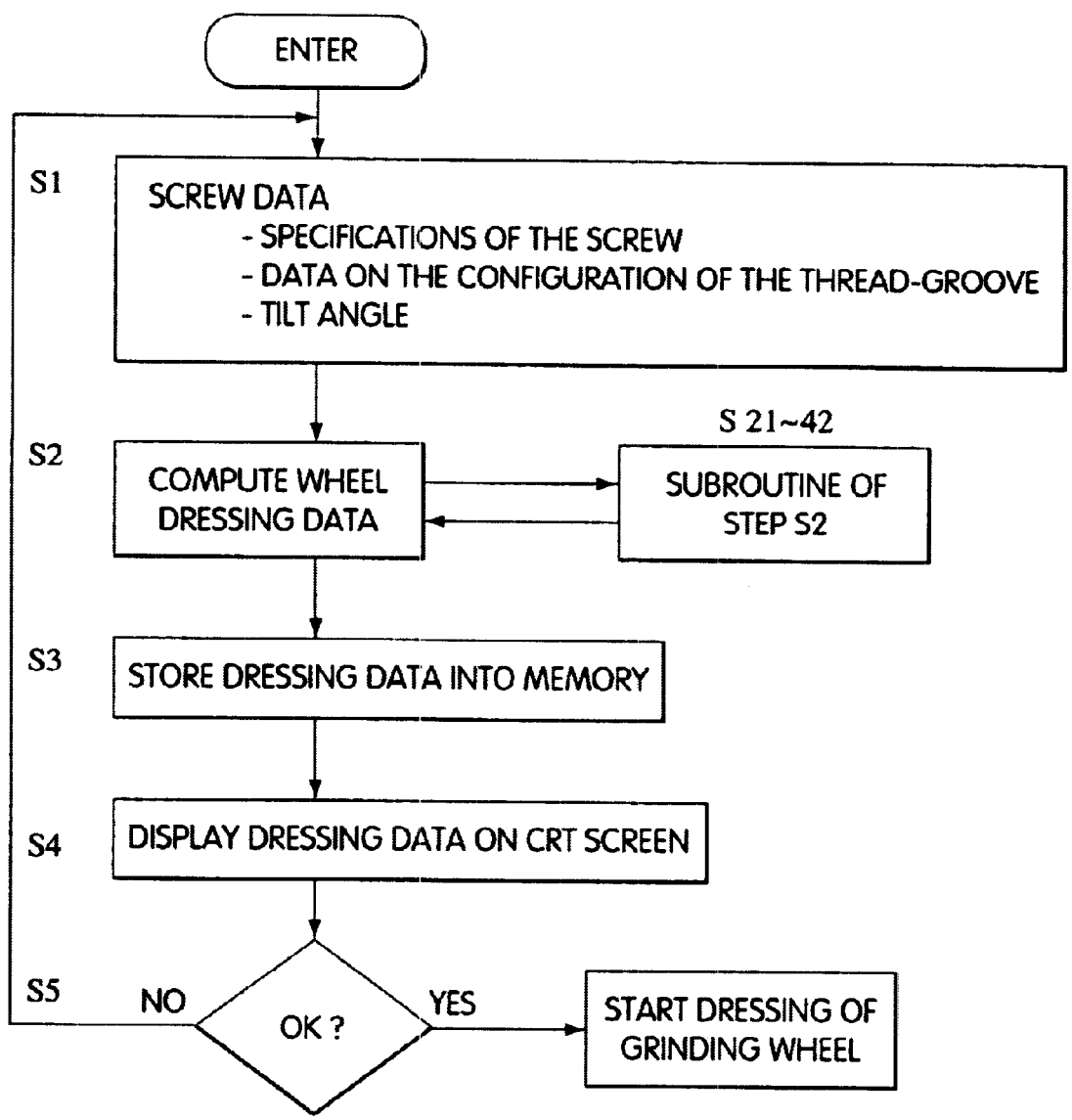
FIG. 6 is a flowchart showing an overall procedure for dressing a grinding wheel in accordance with the present invention.

FIG. 6 is a flowchart showing an overall procedure for dressing the grinding wheel 19. In Step S1, various characteristics (specifications) of the female screw to be machined, data on the configuration of the thread-groove, and the aforementioned tilt angle $\xi$ are entered into the numerically controlled machine tool through an appropriate input device or devices (not shown). In Step S2, the program for calculating the dressing data is executed to start the processing of the data entered in the previous step.

The essence of the method of this embodiment for machining a female screw is implemented in Steps S1 and S2, which is described in Steps S21 to S42 as a subroutine with reference to the flowcharts of FIGS. 7–9. Upon completion of the subroutine of Step S2, the process returns to the flowchart of FIG. 6 and continues to Step S3.

Referring to the flowchart of FIG. 7, in Step S21, the following data on the configuration of a screw to be machined is loaded into a processing unit (not shown) of the numerically controlled machine tool 100 so as to be processed by the program for generating dressing data:

L: the lead of the screw;
R: the radius of the Gothic arc;
F: the Gothic arc offset value;
$D_o$: the diameter of the female ball screw as measured between the centers of diametrically opposing balls;
Dmax: the diameter of the cross-section of the grinding wheel at the center of the wheel's width; and
$\xi$: the tilt angle of the axis of the grinding wheel spindle 18 with respect to the axis of the workpiece 31.

Thereupon, the process goes on to Step S22, in which the calculation interval $W_0$ along the width of the wheel and the number J of points to be calculated on the screw groove locus on a cross-section of the grinding wheel spindle (i.e., "J" corresponds to the last or greatest value of the variable I, which will be described below) are entered into the processing unit.

In the following Step S23, the lead angle $\alpha$, the distance Dx from the center of a ball of the ball screw to the bottom of the screw, and the distance P from the axis of the female screw to the center of the grinding wheel are calculated from the entered data on the configuration of the screw groove as follows (see FIG. 5):

$$\alpha=\tan^{-1}\{L/(\pi \cdot D_o)\} \quad (1)$$

$$Dx=\sqrt{R^2-F^2}-F \quad (2)$$

The distance P from the axis of the female screw to the center of the grinding wheel is calculated by the following equation on the basis of the distance Dx given by the equation (2).

$$P=(D_o/2)+Dx-(D\text{max}/2) \quad (3)$$

In addition, the initial value of a repetition variable K is set to 0 (K=0). Each value of the repetition variable K corresponds to a specific cross section normal or perpendicular to the axis of the grinding wheel (i.e., $W_1(K)$ indicates the width of the wheel for the Kth cross-section) and is used to indicate the widthwise location of the corresponding cross-section (A—A cross-sections in FIG. 10A). The initial value of the width $W_1(K)$ of the grinding wheel is set to 0 ($W_1(K)=0$)

In Step S24, the coordinates ($x_o$, $y_o$) of the center of the grinding wheel is given by the following expressions on the basis of the foregoing results and the tilt angle $\xi$:

$$x_o=W_1(K)\tan \xi \quad (4)$$

$$y_o=(D_o-D\text{max})/2-F+\sqrt{R^2-F^2} \quad (5)$$

where $W_1(K)$ represents the width of the grinding wheel at the Kth cross-section. The initial value of the repetition variable I is set to 0 (I=0). As mentioned above, the initial value of the width $W_1(K)$ of the grinding wheel is set to 0 ($W_1(K)=0$). Thus, the relational expression $W_1(K)=W_1(K-1)+W_0$ is established.

Next, with reference to FIG. 5, the polar coordinates ($\tau$, D/2) of the locus of the groove on a section normal to the central axis of the screw are calculated with "D" defined as the diameter of the female ball screw. Regarding the locus of the groove on a section normal to the central axis of the female ball screw (or the nut), the following relational expression is given:

$$M=\sqrt{R^2-\{(D-D_o)/2+F\}^2}-F \quad (6)$$

Additionally, if $$N=\sin \alpha/D+(\pi/L)\cos \alpha \quad (7)$$

then, $\tau$ of the polar coordinates ($\tau$, D/2) is given as follows:

$$\tau=2MN \quad (8)$$

In Step S25, the diameter D of the female screw is given by the equation (9) below, and thus the difference $X_D$ in radius between D and $D_o$ (the diameter of the female ball screw as measured between the centers of diametrically opposing balls) can also be obtained based on the equation (9).

$$D=D_o+2Dx \cos(\pi I/2J) \quad (9)$$

As described above, the coordinates ($\tau$, D/2) shown in FIG. 10C as well as FIG. 5 can be determined by the equations (6)–(8) and (9), which give $\tau$ and D, respectively.

FIGS. 10A–D are views explaining symbols used in the operational expressions for calculating data on the dressing of the grinding wheel, in which FIG. 10A shows the sinusoidal locus of the screw groove projected onto a female screw's longitudinal cross-sectional plane in which the screw axis is located. The following expressions give the coordinates (u, w) of the intersection of this sinusoidal locus of the screw groove and the plane normal to the axis of the internal grinding wheel spindle, with the spindle's axis tilted at the angle $\xi$ relative to the axis of the female screw.

$$u=(D/2)\sin\left[\tau+(2\pi w/L)\{w-(W_1(K)/\cos\xi)\}\right] \quad (10)$$

$$u=w/\tan\xi \quad (11)$$

where $W_1(K)$ is the width of the grinding wheel measured from the central width of the wheel. The coordinates (u, w) of the intersection are given by solving the expression (11) for u and w.

Next, the coordinates (Xs, Ys) of the locus of the screw groove on the section normal to the axis of the internal grinding wheel spindle (see FIGS. 10B and 10D) are given by the following expressions:

$$Xs=u/\cos\xi \quad (12)$$

$$Ys=b\sqrt{1-(Xs/a)^2} \quad (13)$$

where $a=D/(2\cos\xi)$ and $b=D/2$.

In FIG. 10B, which is a projection of FIG. 10A onto a plane tilted at the angle $\xi$, the coordinates (Xs, Ys) correspond to a point on the circumference of an ellipse which has an major axis (a) and a minor axis (b). Hence, as the diameter (D) of the female screw is a variable, the locus of the screw groove on the section normal to the axis of the internal grinding wheel spindle is given by calculating the coordinates (Xs, Ys).

Furthermore, the locus of the screw groove on each section normal to the axis of the internal grinding wheel spindle is given, as $W_1$ is a variable.

Referring to the flowchart of FIG. 8, in Step S26, the coordinate u is determined by calculation of the expressions (10) and (11). Thereupon, the coordinate Xs is determined by the coordinate u and the expression (12), whereas the coordinate Ys is determined by calculation from the coordinate Xs and the expression (13). The shortest of the distances $D_1$ between the center of the grinding wheel ($x_o$, $y_o$) and the coordinates (Xs(I), Ys(I)) is the diameter of the grinding wheel (expression (16)):

$$Xs(I)=u/\cos\xi \quad (14)$$

$$Ys(I)=b\sqrt{1-(Xs(I)/a)^2} \quad (15)$$

$$D_1(I)=2\sqrt{\{Xs(I)-x_o\}^{2}+\{Ys(I)-y_o\}^2} \quad (16)$$

The smallest value of $D_1(I)$ as computed above is the diameter of the grinding wheel. Accordingly, with the wheel width $W_1$ as a variable, the diameter $D_1$ of the dressed grinding wheel can be given at each wheel widthwise location of the wheel, thus allowing the determination of the shape of the wheel.

In Step S27, it is determined whether I=J. If I is less than J, I is incremented by 1 (I→I+1) in Step S28, whereupon the process goes to Step S25 to repeat the previously described computation. If it is determined that I=J in Step S27, the process continues to Step S29, where substitution $D_1(-1)=0$ and I=0 is made.

In the following Step S30, whether $D_1(I-1)-D_1(I)>0$ and whether $D_1(I)-D_1(I+1)>0$ is determined. If YES, K is incremented by 1 (K→K+1) in $D_1(K)=D_1(I)$ and $W_1(K)=W_1(K-1)+W_0$, and the process returns to Step S24 to obtain the coordinates ($x_o$, $y_o$) from $x_o=W_1(K)\tan\xi$.

If the answer is NO in Step S30, determination of whether I=J is made in Step S32. If the answer in Step S32 is YES, the process goes to Step S34. If the answer in Step S32 is NO, I is incremented again by 1 (I→I+1) in Step S33 to return the process to Step S30.

The dressing of the grinding wheel is performed under simultaneous triaxial control of the x-, z-, and b-axes of the NC machine tool with the quill (i.e., the axis of the wheel spindle) tilted relative to the axis of the workpiece to be machined into a female ball screw. Accordingly, as the diameter $D_1$ and the width $W_1$ are displaced by the angle $\xi$ with respect to the wheel spindle assembly 17, compensation for the displacement is calculated by the following expressions (17)–(19):

$$X_1=2\sqrt{(D_{1/2})^2-(W_{1\tan\xi})^2} \quad (17)$$

$$Z_1=W_1/\cos\xi \quad (18)$$

$$B_1=\tan^{-1}(\Delta Z_1/(\Delta X_1/2)) \quad (19)$$

where $\Delta Z_1=Z_1(K+1)-Z_1(K-1)$, $\Delta X_1=X_1(K+1)-X_1(K-1)$, $X_1$ represents the amount of control along the x-axis (the movement or feed of the wheel dressing device 3), $Z_1$ represents the amount of control along the z-axis (the movement of the wheel spindle assembly 17), and $B_1$ represents the amount of control about the b-axis (the rotation of the single point dresser 12).

If it is determined that I=J in Step S32 and calculations of the diameter $D_1$ and the width $W_1$ are completed, data is calculated for the triaxial control of the x-, z-, and b-axes with respect to the tilt angle $\xi$ by the expressions (17)–(19) above in order to generate the data on the dressing of the grinding wheel.

Referring to FIG. 9, on the basis of the conditions given in Step S34, $X_1(K)$ and $Z_1(K)$ are repeatedly calculated by the expressions (20) and (21) in Step S35 until K reaches a predetermined value (Steps S36 and S37).

$$X_1(K)=2\sqrt{\{(D_{1(K)/2})\}^2-(W_{1(K)\tan\xi})^2} \quad (20)$$

$$Z_1(K)=W_1(K)/\cos\xi \quad (21)$$

"K0=K" in Steps S34 and S36 indicates that the calculation of the expressions (20) and (21) are started at the initial value of K.

Upon completion of the calculations of Step S35, the process goes to Step S38, in which an initial condition K=1 is given. In Steps S39–41, B(K) (the data on the rotation of the single point dresser about the b-axis) is calculated by the following expression (22) until K reaches K+1 (Steps S40 and S41):

$$B_1(K)=\tan^{-1}\left[Z_1(K+1)-Z_1(K-1)/\{(X_1(K+1)-X_1(K-1))/2\}\right] \quad (22)$$

When K=K+1, the process goes to Step S42, in which the $B_1(K)$ data obtained in Step S39 is supplemented with the substitution $B_1(0)=B_1(1)$ and $B_1(K0)=B_1(K0-1)$, thus completing this subroutine.

Once Steps S21–42 are completed as described above, the process exits this subroutine and goes to Step S3 shown in FIG. 6, in which the data obtained in the subroutine is stored in memory. In Step S4, the data is output to a CRT display coupled to the processing unit of the NC grinder 100 as a view of a locus for dressing the grinding wheel 19. In Step S5, the operator observes the view of the locus displayed on the CRT screen and checks to see if the dressing locus is correct. If the locus is determined to be correct in this step, a wheel dressing operation is started whereby the dressing of the grinding wheel 19 is performed with the single point dresser 12 under simultaneous triaxial control of the movement or feed of the table 14 along the z-axis, the movement of the cross slide 1 along the x-axis, and the rotation of the tip of the dresser 12 about the b-axis, with the axis of the wheel spindle tilted relative to the axis of the workpiece 31. If the answer is NO (the dressing locus is incorrect) in Step S5, the process returns to Step S1, repeating the execution of the steps of the flowchart shown in FIG. 6. Subsequently, when the grinding wheel 19 is dressed based on a correct dressing locus, the female screw groove is machined in the hole in the workpiece 31 with the dressed grinding wheel 19 by relative rotation between the workpiece 31 and the grinding wheel as well as relative movement between the grinding wheel and the workpiece 31 along the z-axis and along the x-axis normal to the z-axis.

As can be seen from the foregoing description, the axis of the wheel spindle is maintained at a tilt angle $\xi$ relative to the axis of the workpiece smaller than the lead angle $\alpha$ of the screw thread while the workpiece is machined. Due to this arrangement, there is no need to reduce the diameter of the grinding wheel or its spindle, thus maintaining the rigidity of the wheel spindle even if a large lead angle $\alpha$ is required.

Furthermore, according to the method of the present invention, no adjustment by trial and error is required to determine the geometry of a grinding wheel as such geometry is automatically calculated from data on certain specifications of the screw and the tilt angle of the wheel spindle with respect to the workpiece axis, which greatly simplifies dressing of internal grinding wheels and machining of female screws.

In addition, the method of the present invention is notable for the use of a single point dresser rather than a form rotary dresser to shape or dress a grinding wheel. As a single point dresser can dress grinding wheels into a variety of shapes, the same dresser can be employed for the machining of a wide range of female screws.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by Letters Patent is:

1. A method of machining a female screw groove in a hole in a female screw workpiece extending along a z-axis with an internal grinding wheel coupled to a spindle having an axis, the axis of the spindle being tilted relative to the z-axis at an angle smaller than the lead angle of the female screw, whereby relative rotation is caused between the workpiece and the grinding wheel while relative movement is caused between the grinding wheel and the workpiece along the z-axis and along an x-axis normal to the z-axis, the method comprising of:
A. providing data representing specifications of the female screw and the tilt angle of the axis of the wheel spindle relative to the z-axis;
B. obtaining data on dressing the grinding wheel from the data representing the specifications of the female screw and the tilt angle of the wheel spindle axis;
C. dressing the grinding wheel on the basis of the obtained dressing data by simultaneous triaxial control of relative movement between the grinding wheel and a single point dresser along the z-axis of the workpiece and the x-axis, and rotation of a tip of the single point dresser about a b-axis in the plane defined by the x- and z-axes; and
D. machining the female screw groove with the dressed grinding wheel.

2. A method of machining a female screw groove in accordance with claim 1, wherein the grinding wheel has a width along the axis of the wheel spindle and the workpiece is machined to a female ball screw with a Gothic arc profile, and further wherein the specifications of the female screw includes data on:
the lead of the female screw;
the radius of the Gothic arc;
a Gothic arc offset value;
the diameter of the female ball screw as measured between the centers of diametrically opposing balls; and
the diameter of the cross-section of the grinding wheel located at the center of the wheel's width and oriented normal to the wheel spindle axis.

3. A method of machining a female screw groove in accordance with claim 2, wherein the grinding wheel has a diameter that changes along the axis of the wheel spindle, and further wherein obtaining data for dressing the grinding wheel includes:
a) calculating the distance from the center of a ball to a bottom of the screw groove and the coordinates of the center of the grinding wheel on a cross-section normal to the wheel spindle axis;
b) determining the polar coordinates of the locus of the female screw groove on a cross-section normal to the axis of the workpiece from the distance calculated in step (a);
c) calculating from the polar coordinates determined in step (b) the sinusoidal locus of the female screw groove projected onto a cross-section in which the axis of the workpiece is located;
d) calculating the coordinates of the intersection of the sinusoidal locus and the wheel cross-section normal to the spindle axis;
e) calculating the diameter of the grinding wheel on the wheel cross-section normal to the spindle axis from the coordinates calculated in step (d) and the coordinates calculated in step (a); and
f) repeating steps (a)–(e) so as to calculate the diameter of the grinding wheel on a plurality of cross-sections normal to the axis of the wheel spindle, thus determining an outer shape of the grinding wheel.

4. A method of machining a female screw groove in accordance with claim 3, wherein the internal grinding wheel, the spindle thereof, and the single point dresser constitute part of a numerically controlled grinder including a processing unit, and further wherein
providing data includes entering the data representing the specifications of the female screw and the tilt angle into the processing unit of the numerically controlled grinder, and
obtaining data for dressing the grinding wheel includes executing in the processing unit a computer program for generating data on an outer shape of the grinding wheel from the data representing the specifications of the female screw and the tilt angle of the spindle axis.

5. A method of machining a female screw groove in accordance with claim 2, wherein the internal grinding wheel, the spindle thereof, and the single point dresser constitute part of a numerically controlled grinder including a processing unit, and further wherein
providing data includes entering the data representing the specifications of the female screw and the tilt angle into the processing unit of the numerically controlled grinder, and obtaining data for dressing the grinding wheel includes executing in the processing unit a computer program for generating data on an outer shape of the grinding wheel from the data representing the specifications of the female screw and the tilt angle of the spindle axis.

6. A method of machining a female screw groove in accordance with claim 1, wherein the grinding wheel has a diameter that changes along the axis of the wheel spindle, and further wherein obtaining data for dressing the grinding wheel includes:

a) calculating the distance from the center of a ball to a bottom of the screw groove and the coordinates of the center of the grinding wheel on a cross-section normal to the wheel spindle axis;

b) determining the polar coordinates of the locus of the female screw groove on a cross-section normal to the axis of the workpiece from the distance calculated in step (a);

c) calculating from the polar coordinates determined in step (b) the sinusoidal locus of the female screw groove projected onto a cross-section in which the axis of the workpiece is located;

d) calculating the coordinates of the intersection of the sinusoidal locus and the wheel cross-section normal to the spindle axis;

e) calculating the diameter of the grinding wheel on the wheel cross-section normal to the spindle axis from the coordinates calculated in step (d) and the coordinates calculated in step (a); and f) repeating steps (a)–(e) so as to calculate the diameter of the grinding wheel on a plurality of cross-sections normal to the axis of the wheel spindle, thus determining an outer shape of the grinding wheel.

7. A method of machining a female screw groove in accordance with claim 6, wherein the internal grinding wheel, the spindle thereof, and the single point dresser constitute part of a numerically controlled grinder including a processing unit, and further wherein providing data includes entering the data representing the specifications of the female screw and the tilt angle into the processing unit of the numerically controlled grinder, and obtaining data for dressing the grinding wheel includes executing in the processing unit a computer program for generating data on an outer shape of the grinding wheel from the data representing the specifications of the female screw and the tilt angle of the spindle axis.

8. A method of machining a female screw groove in accordance with claim 1, wherein the internal grinding wheel, the spindle thereof, and the single point dresser constitute part of a numerically controlled grinder including a processing unit, and further wherein providing data includes entering the data representing the specifications of the female screw and the tilt angle into the processing unit of the numerically controlled grinder, and obtaining data for dressing the grinding wheel includes executing in the processing unit a computer program for generating data on an outer shape of the grinding wheel from the data representing the specifications of the female screw and the tilt angle of the spindle axis.

9. A method of machining a female screw groove in accordance with claim 8, wherein executing a computer program includes compensating the data on the outer shape for the tilt angle of the axis of the grinding wheel spindle.

10. A method of dressing with a single point dresser an internal grinding wheel for machining a female screw, the grinding wheel including a spindle which has an axis tilted during dressing relative to a z-axis of a workpiece at an angle smaller than the lead angle of the female screw to be machined in the workpiece, the method comprising:

I. providing data representing specifications of the female screw and the tilt angle of the spindle axis relative to the z-axis of the workpiece;

II. calculating data representing an outer shape of the grinding wheel from the data representing specifications of the female screw and the tilt angle of the wheel spindle axis;

III. generating, from the data calculated in step II, data representing (i) relative movement between the single point dresser and the grinding wheel along the z-axis and an x-axis normal to the z-axis and (ii) simultaneous rotation of a tip of the single point dresser in the x-z plane about a b-axis normal to the x-z plane; and IV. dressing the grinding wheel on the basis of the data generated in step (III).

11. A method in accordance with claim 10, wherein the grinding wheel has a width along the axis of the wheel spindle and the workpiece is machined to a female ball screw with a Gothic arc profile, and further wherein the specifications of the female screw includes data on:

the lead of the female screw;

the radius of the Gothic arc;

a Gothic arc offset value;

the diameter of the female ball screw as measured between the centers of diametrically opposing balls; and the diameter of the cross-section of the grinding wheel located at the center of the wheel's width and oriented normal to the wheel spindle axis.

12. A method in accordance with claim 11, wherein the grinding wheel has a diameter that changes along the axis of the wheel spindle, and further wherein calculating data representing an outer shape of the grinding wheel includes:

a) calculating the distance from the center of a ball to a bottom of the screw and the coordinates of the center of the grinding wheel on a cross-section normal to the wheel spindle axis;

b) determining the polar coordinates of the locus of the female screw groove on a cross-section normal to the axis of the workpiece from the distance calculated in step (a);

c) calculating from the polar coordinates determined in step (b) the sinusoidal locus of the female screw groove projected onto a cross-section in which the axis of the workpiece is located;

d) calculating the coordinates of the intersection of the sinusoidal locus and the wheel cross-section normal to the spindle axis;

e) calculating the diameter of the grinding wheel on the wheel cross-section normal to the spindle axis from the coordinates calculated in step (d) and the coordinates calculated in step (a); and f) repeating steps (a)–(e) so as to calculate the diameter of the grinding wheel on a plurality of cross-sections normal to the axis of the wheel spindle, thus determining an outer shape of the grinding wheel.

13. A method in accordance with claim 12, wherein the internal grinding wheel, the spindle thereof, and the single point dresser constitute part of a numerically controlled grinder including a processing unit, and further wherein step (I) includes entering the data representing the specifications of the female screw and the tilt angle into the processing unit of the numerically controlled grinder, and step (II) includes executing in the processing unit a computer program for generating data on an outer shape of the grinding wheel from the data representing the specifications and the tilt angle.

14. A method in accordance with claim 11, wherein the internal grinding wheel, the spindle thereof, and the single point dresser constitute part of a numerically controlled grinder including a processing unit, and further wherein step (I) includes entering the data representing the specifications of the female screw and the tilt angle into the processing unit of the numerically controlled grinder, and step (II) includes executing in the processing unit a computer program for generating data on an outer shape of the grinding wheel from the data representing the specifications and the tilt angle.

15. A method in accordance with claim 10, wherein the grinding wheel has a diameter that changes along the axis of the wheel spindle, and further wherein calculating data representing an outer shape of the grinding wheel includes:

a) calculating the distance from the center of a ball to a bottom of the screw and the coordinates of the center of the grinding wheel on a cross-section normal to the wheel spindle axis;

b) determining the polar coordinates of the locus of the female screw groove on a cross-section normal to the axis of the workpiece from the distance calculated in step (a);

c) calculating from the polar coordinates determined in step (b) the sinusoidal locus of the female screw groove projected onto a cross-section in which the axis of the workpiece is located;

d) calculating the coordinates of the intersection of the sinusoidal locus and the wheel cross-section normal to the spindle axis;

e) calculating the diameter of the grinding wheel on the wheel cross-section normal to the spindle axis from the coordinates calculated in step (d) and the coordinates calculated in step (a); and f) repeating steps (a)–(e) so as to calculate the diameter of the grinding wheel on a plurality of cross-sections normal to the axis of the wheel spindle, thus determining an outer shape of the grinding wheel.

16. A method in accordance with claim 15, wherein the internal grinding wheel, the spindle thereof, and the single point dresser constitute part of a numerically controlled grinder including a processing unit, and further wherein step (I) includes entering the data representing the specifications of the female screw and the tilt angle into the processing unit of the numerically controlled grinder, and step (II) includes executing in the processing unit a computer program for generating data on an outer shape of the grinding wheel from the data representing the specifications and the tilt angle.

17. A method in accordance with claim 10, wherein the internal grinding wheel, the spindle thereof, and the single point dresser constitute part of a numerically controlled grinder including a processing unit, and further wherein step (I) includes entering the data representing the specifications of the female screw and the tilt angle into the processing unit of the numerically controlled grinder, and step (II) includes executing in the processing unit a computer program for generating data on an outer shape of the grinding wheel from the data representing the specifications and the tilt angle.

* * * * *